United States Patent [19]
Takano et al.

[11] Patent Number: 5,171,960
[45] Date of Patent: Dec. 15, 1992

[54] DIRECT-CURRENT RESISTANCE WELDING APPARATUS AND METHOD OF CONTROLLING WELDING CURRENT THEREOF

[75] Inventors: Fumitomo Takano; Nobuo Kobayashi; Kazuo Isogai; Hitoshi Saito; Kenji Miyanaga, all of Sayama, Japan

[73] Assignee: Honda Giken Kogyo Kabushiki Kaisha, Tokyo, Japan

[21] Appl. No.: 785,261

[22] Filed: Oct. 30, 1991

[30] Foreign Application Priority Data

Nov. 7, 1990 [JP] Japan .................................. 2-301353
Nov. 7, 1990 [JP] Japan .................................. 2-301354
Mar. 25, 1991 [JP] Japan .................................. 3-060349

[51] Int. Cl.$^5$ ............................................ B23K 11/24
[52] U.S. Cl. .................................................. 219/108
[58] Field of Search ...................... 219/108, 110, 117.1

[56] References Cited

U.S. PATENT DOCUMENTS 5,072,090 12/1991 Morita ................................ 219/108

FOREIGN PATENT DOCUMENTS 55-92485 12/1978 Japan .
63-133884 9/1988 Japan .

Primary Examiner—Clifford C. Shaw

[57] ABSTRACT

A direct-current resistance welding apparatus includes pneumatic actuators for pressurizing welding guns, respectively, to grip respective workpieces, an inverter composed of a plurality of parallel-connected switching device units each comprising a pair of series-connected switching devices, and a plurality of welding transformers connected to the welding guns, respectively, and also connected between the switching device units. A timer circuit applies an energization signal to energize the switching device units. The pneumatic actuators are actuated by a control circuit to pressurize the welding guns and successively energize the switching device units according to s sequence read from a sequence memory circuit.

6 Claims, 17 Drawing Sheets

FIG.11

| Trn / Energized Transformer | Tr1 | Tr2 | Tr3 | Tr4 | Tr5 | Tr6 | Tr7 | Tr8 | Tr9 | Tr10 | Tr11 | Tr12 |
|---|---|---|---|---|---|---|---|---|---|---|---|---|
| T1 | ON/OFF | ON/OFF | ON | ON | ON/OFF | ON/OFF | ON | ON | OFF | OFF | OFF | OFF |
| T2 | ON | ON/OFF | ON/OFF | ON | ON | ON/OFF | ON/OFF | ON | OFF | OFF | OFF | OFF |
| T3 | ON | ON | ON/OFF | ON/OFF | ON | ON | ON/OFF | ON/OFF | OFF | OFF | OFF | OFF |
| T4 | OFF | OFF | OFF | OFF | ON/OFF | ON/OFF | ON | ON | ON/OFF | ON/OFF | ON | ON |
| T5 | OFF | OFF | OFF | OFF | ON | ON/OFF | ON/OFF | ON | ON | ON/OFF | ON/OFF | ON |
| T6 | OFF | OFF | OFF | OFF | ON | ON | ON/OFF | ON/OFF | ON | ON | ON/OFF | ON/OFF |

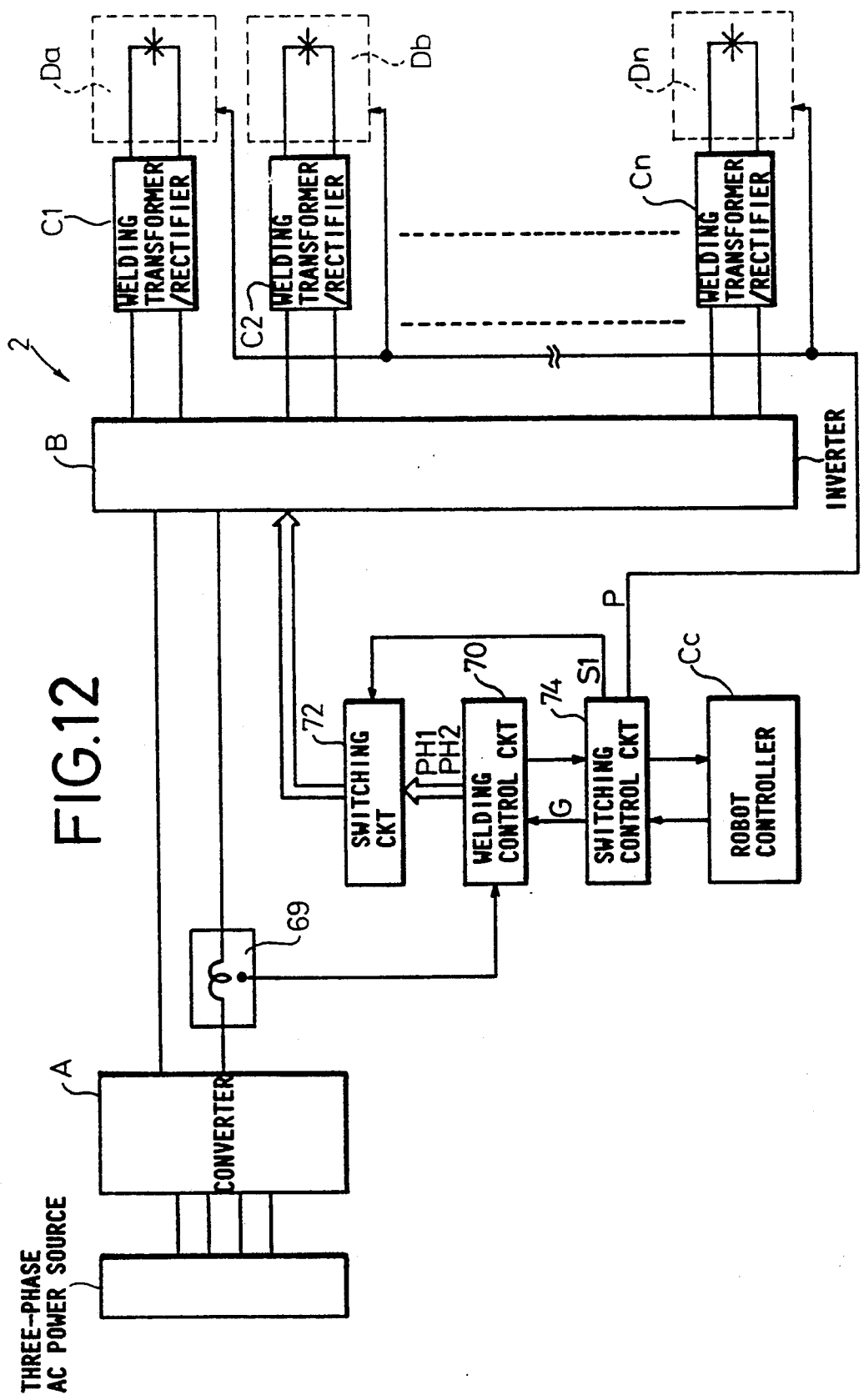

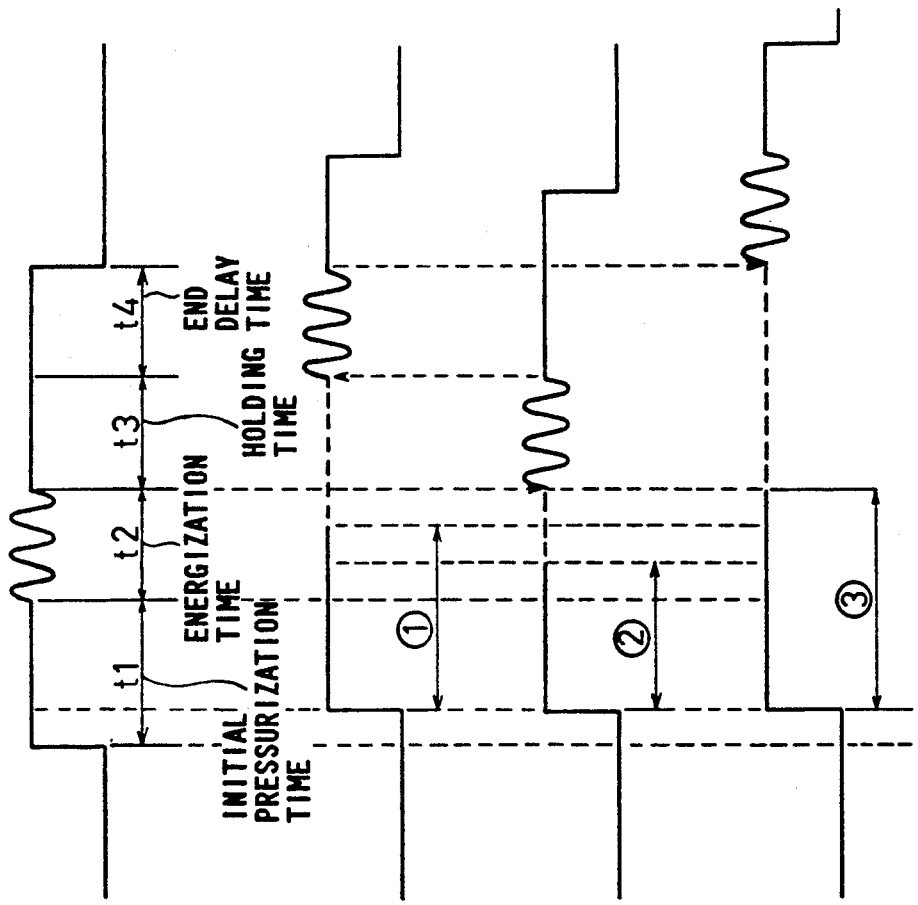

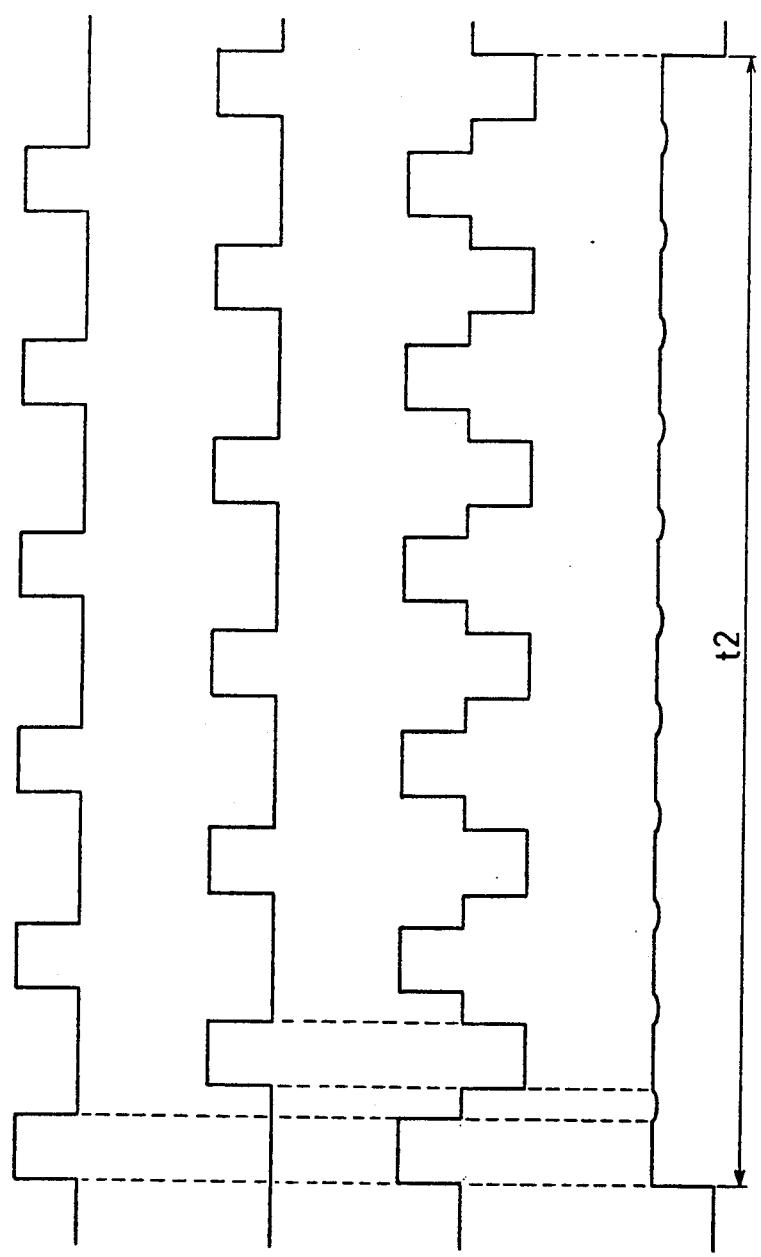

DIRECT-CURRENT RESISTANCE WELDING APPARATUS AND METHOD OF CONTROLLING WELDING CURRENT THEREOF

BACKGROUND OF THE INVENTION

1. Field of the Invention

The present invention relates to a direct-current resistance welding apparatus for controlling a plurality of welding guns with a single inverter circuit and a welding timer circuit, and also for pressing the welding guns against a workpiece and energizing the welding guns according to independent control processes, and a method of controlling the welding current of the direct-current resistance welding apparatus.

2. Description of the Prior Art

Some known direct-current resistance welding apparatus have a plurality of welding guns that are supplied with welding currents by a single inverter circuit and a welding timer circuit. There are known two different processes for controlling the welding guns. According to the first process, a welding gun is controlled to grip a workpiece and then supply a welding current to the workpiece. Thereafter, another welding gun is controlled to grip a workpiece and then supply a welding current to the workpiece. Such a two-step operation is carried out successively with respect to all the welding guns. In the second process, all the welding guns are simultaneously controlled to grip respective workpieces, and then the welding guns are successively controlled to supply welding currents to the workpieces.

The first process requires a circuit to prevent the welding guns from gripping the workpieces simultaneously for thereby preventing a welding current, which has been supplied to a workpiece, from flowing to other workpieces. The second process needs either a switching switch connected to the primary winding of a welding transformer or a current distributor connected to the secondary winding of the welding transformer for preventing a welding current from flowing to other welding guns, as disclosed in Japanese Laid-Open Utility Model Publications Nos. 55-92485 and 63-133884.

According to the first process, while a workpiece is being gripped by a welding gun, the inverter circuit is inactivated, and while the inverter circuit is in operation, all presser mechanisms coupled to the welding guns are at rest. Therefore, the direct-current resistance welding apparatus that are controlled according to the first process are inefficient in operation. Moreover, the circuit to prevent the welding guns from gripping the workpieces simultaneously makes the direct-current resistance welding apparatus complex in structure and large in size.

The direct-current resistance welding apparatus that operate according to the second process are also complex in structure and large in size because of either the switching switch connected to the primary winding of the welding transformer or the current distributor connected to the secondary winding of the welding transformer. Another problem is that a relatively large voltage drop is developed by the current distributor.

SUMMARY OF THE INVENTION

It is an object of the present invention to provide a direct-current resistance welding apparatus which is relatively simple in structure, small in size, and is capable of welding at a plurality of locations in a short period of time.

According to the present invention, there is provided a direct-current resistance welding apparatus comprising a plurality of welding guns, a plurality of pressurizing means for pressurizing the welding guns, respectively, to grip respective workpieces, an inverter composed of a plurality of parallel-connected switching device units each comprising a pair of series-connected switching devices, a plurality of welding transformers connected to the welding guns, respectively, and also connected between the switching device units, a sequence memory circuit for storing a sequence to energize the welding transformers, a timer circuit for applying an energization signal to energize the switching device units, and a control circuit for actuating the pressurizing means to pressurize the welding guns and successively energizing the switching device units according to the sequence read from the sequence memory circuit. The control circuit may energize the timer circuit to produce a signal for successively energizing the switching device units. The control circuit may energize the timer circuit to produce a signal for successively energizing selected ones of the pairs of switching device units.

According to the present invention, there is provided a direct-current resistance welding apparatus comprising a plurality of welding guns, a plurality of pressurizing means for pressurizing the welding guns, respectively, to grip respective workpieces, an inverter composed of a plurality of parallel-connected switching device groups each comprising a plurality of series-connected switching devices, a plurality of welding transformers connected to the welding guns, respectively, and also connected between the switching device groups, a sequence memory circuit for storing a sequence to energize the welding transformers, a timer circuit for applying a control signal to control the switching devices, and a control circuit for actuating the pressurizing means to pressurize the welding guns and energizing the switching devices according to the sequence read from the sequence memory circuit. The timer circuit comprises may produce an energization signal to energize the switching devices. The control circuit comprises means may energize the timer circuit to produce an energization signal to energize the switching devices in each switching cycle of the inverter. The timer circuit may produce a control signal to energize or de-energize the switching devices. The control circuit may energize the timer circuit to produce a signal to energize selected ones of the switching devices corresponding to the welding transformers, respectively, and thereafter to energize or de-energize the remaining switching devices.

According to the present invention, there is also provided a method of controlling a direct-current resistance welding transformer having a plurality of welding transformers, a plurality of welding guns connected respectively to the welding transformers, and an inverter composed of a plurality of switching devices corresponding to the welding transformers, respectively, the method comprising the steps of pressurizing the welding guns in a prescribed combination to grip workpieces, energizing selected ones of the switching devices, and either energizing or deenergizing the remaining switching devices.

According to the present invention, there is further provided a direct-current resistance welding apparatus comprising a converter for converting an alternating current into a direct current, an inverter for converting the direct current into a high-frequency alternating current, the inverter comprising a plurality of switching devices, a plurality of welding guns for welding workpieces with direct currents produced by rectifying the high-frequency alternating current, a plurality of pressurizing means for pressing the welding guns against the workpieces, a switching circuit for producing switching pulses to energize the switching devices, a welding control circuit for producing a train of pulses to determine a welding time period, a controller for storing job information with respect to each of the welding guns, and a switching control circuit for actuating the pressurizing means to press the welding guns against the workpieces for pressurization time periods according to the job information from the controller, storing the order of the welding guns with respect to the completion of the pressurization time periods, supplying the switching circuit with information indicative of the welding gun for which the pressurization time period is over earlier than the other welding guns, in response to an energization ending signal from the welding control circuit, and applying an energization starting signal to the welding control circuit.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 is a table showing a control map for controlling the transistors of the inverter shown in FIG. 8;

FIG. 12 is a block diagram of a direct-current resistance welding apparatus according to a seventh embodiment of the present invention;

FIGS. 16(a)-16(d) are timing charts of an operation sequence of the direct-current resistance welding apparatus shown in FIG. 12; and FIGS. 17(a)-16(d) are timing charts of an operation sequence of the direct-current resistance welding apparatus shown in FIG. 12.

DETAILED DESCRIPTION OF THE PREFERRED EMBODIMENTS

Figure 1:
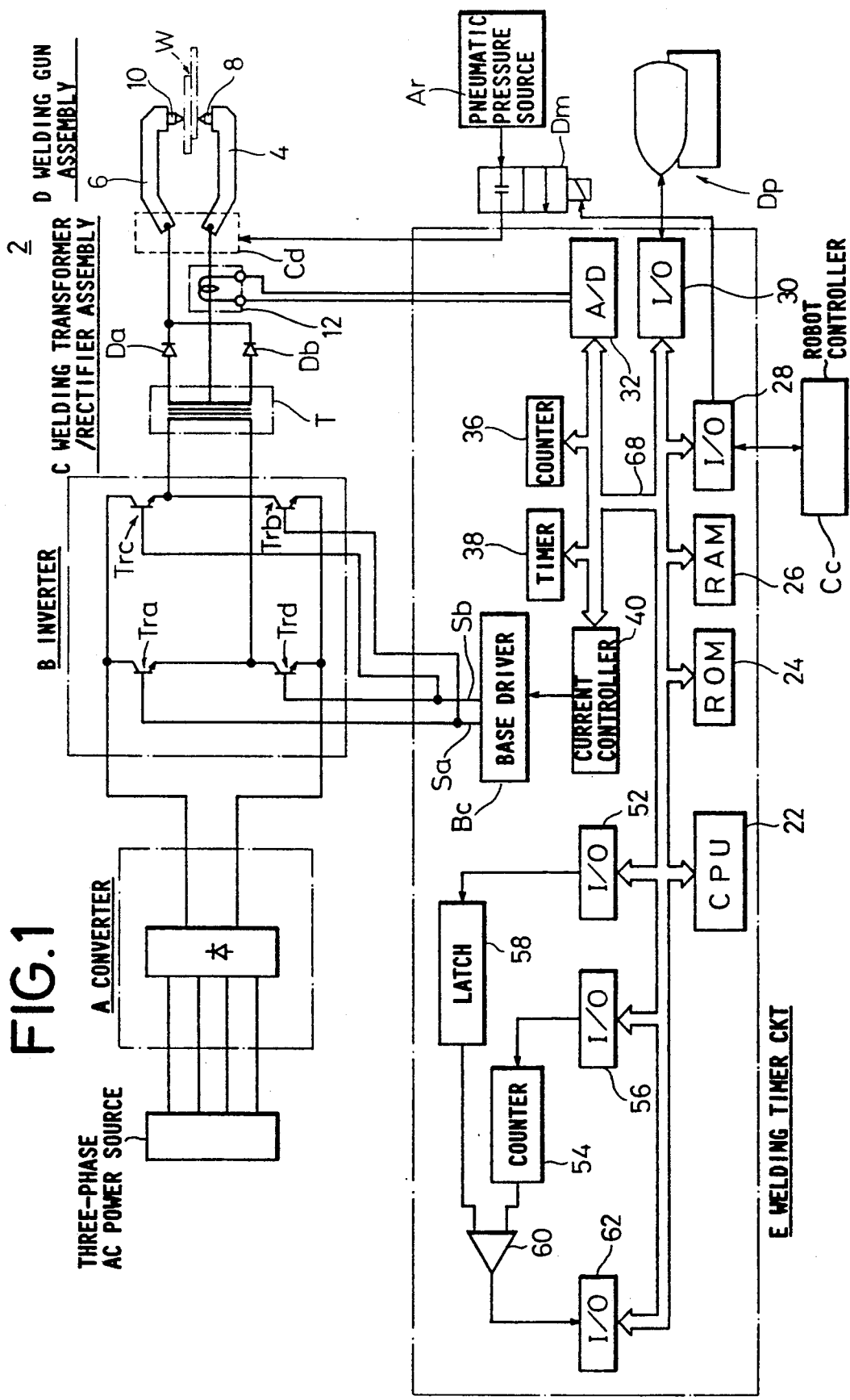
FIG. 1 is a block diagram of a direct-current resistant welding apparatus according to a first embodiment of the present invention.

FIG. 1 shows in block form a direct-current resistance welding apparatus, generally designated by the reference numeral 2, according to a first embodiment of the present invention. The direct-current resistance welding apparatus 2 generally comprises a converter A connected to a three-phase alternating-current power supply, an inverter B connected to the converter A, a welding transformer/ rectifier assembly C, a welding gun assembly D, and a welding timer circuit E for supplying pulse-width-modulated (PWM) signals to the inverter B.

The converter A serves to convert three-phase alternating currents supplied from the three-phase alternating-current power supply into a direct current. The inverter B comprises a full bridge of power transistors Tra, Trb, Trc, Trd for converting the direct current from the converter A into a high-frequency alternating current.

The welding transformer/rectifier assembly C comprises a welding transformer T supplied with the high-frequency alternating current from the inverter B, and rectifiers Da, Db for converting a low-voltage high-frequency alternating current from the welding transformer T into a direct current. The welding gun assembly D has a pair of movable gun arms 4, 6 that can be actuated by a pneumatic cylinder Cd pneumatically connected to a pneumatic pressure source Ar through a solenoid-operated on/off valve Dm. The movable gun arm 4 and the welding transformer T are electrically connected to each other by a wire that is associated with a current detector 12 for detecting a welding current supplied to a workpiece W gripped by the movable gun arms 4, 6. The current detector 12 may comprise a toroidal core or the like. The movable gun arms 4, 6 have respective welding electrodes 8, 10 that are held against the workpiece W.

The welding timer circuit E comprises a CPU 22 for controlling the welding operation carried out by the direct-current resistance welding apparatus, a ROM 24 storing programs for carrying out a preliminary energization control process, a main energization delay control process, a ramp energization control process, a main energization control process, and a quasi-welding-interrupt control process, a RAM 26 for storing various items of information produced while the programs are being executed and also welding conditions entered by the operator, and an input/output (I/O) interface 28 for transmitting signals to and receiving signals from a robot controller Cc, the input/output interface 28 being connected to the solenoid-operated on/off valve Dm.

The welding timer circuit E also includes another I/O interface 30 for interfacing a keyboard through which the operator enters welding conditions into the welding timer circuit E and a display unit Dp for displaying the entered welding conditions, an A/D converter 32 connected to the current detector 12, a counter 36 for counting clock pulses of an energization initializing signal (described later on), a timer 38 for monitoring a period of time, shorter than a predetermined period of time, from the start of transmission of clock pulses of the energization initializing signal, a base driver Bc for supplying PWM base currents Sa, Sb to the transistors Tra through Trd, and a current controller 40 for transmitting a timing signal to the base driver Bc.

The welding timer circuit E further includes a counter 54 connected to an I/O interface 56, for monitoring or measuring a main energization delay time period that is stored in the RAM 26, a latch 58 connected to an I/O interface 52, for latching the main energization delay time period stored in the RAM 26, a comparator 60 connected to the counter 54 and the latch 58, for comparing output signals from the counter 54 and the latch 58 and outputting a main energization signal when the compared output signals agree with each other, and an I/O interface 62 connected to the output terminal of the comparator 60. The CPU 22, the ROM 24, the RAM 26, the I/O interfaces 28, 30, 52, 56, 62, the A/D converter 32, the counter 36, the timer 38, and the current controller 40 are connected to a bus 68.

The RAM 26 stores a preset value N for the preliminary energization control process and a preset time period $t_b$ for the timer 38, the preset value N and the preset time period tb being entered from the keyboard.

Welding operation of the direct-current resistance welding apparatus 2 will be described below with reference to the timing chart of FIG. 2.

Figure 2:
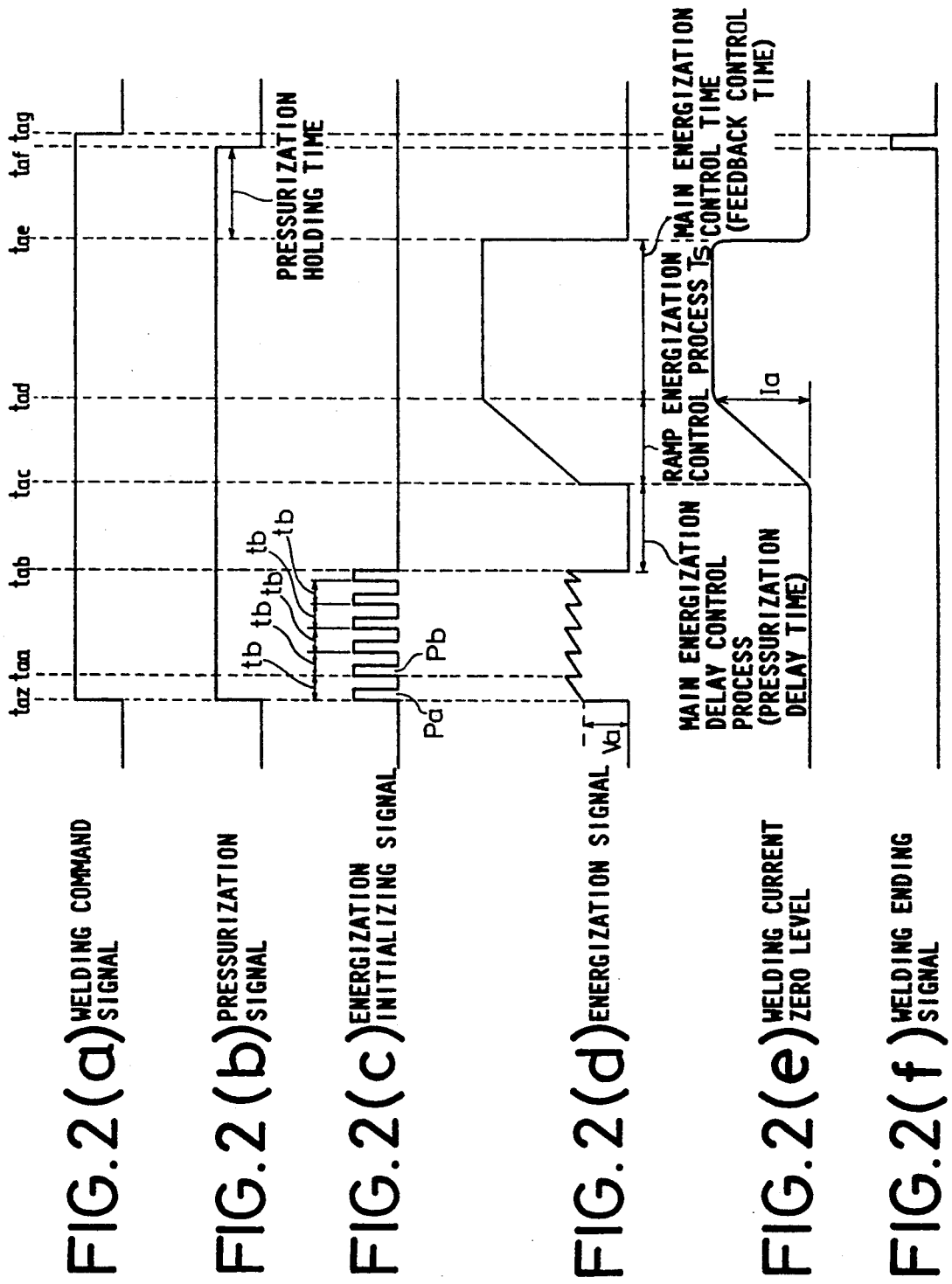
FIGS. 2(a)-2(f) are timing charts of signal waveforms on a time base in the operation of the direct-current resistance welding apparatus shown in FIG. 1.

At a time $t_{az}$, a welding command signal (see FIG. 2 at (a)) is supplied from the robot controller Cc through the I/O interface 28 to the CPU 22.

In response to a leading edge of the supplied welding command signal, the CPU 22 reads the programs for the preliminary energization control process, the main energization delay control process, the ramp energization control process, the main energization control process, and the quasi-welding-interrupt control process from the ROM 24, and also reads the welding conditions from the RAM 26. At this time, the CPU 22 supplies a pressurization signal (see FIG. 2 at (b)) through the I/O interface 28 to the solenoid-operated on/off valve Dm. Air under pressure is supplied from the pneumatic pressure source Ar through the solenoid-operated on/off valve Dm to the pneumatic cylinder Cd, which actuates the movable gun arms 4, 6 to grip the workpiece W.

At the time $t_{az}$, the CPU 22 reads a clock pulse Pa of the energization initializing signal (see FIG. 2 at (c)) from the RAM 26, and supplies the clock pulse Pa to the counter 36, the timer 38, and the current controller 40.

The count of the counter 36 is now set to "1", and the timer 38 starts monitoring the time period from a leading edge of the clock pulse Pa. The current controller 40 is now supplied with a sloping energization signal (see FIG. 2 at (d)) having an initial value Va, which is read from the RAM 26. Based on the sloping energization signal, the current controller 40 applies a timing gate signal to the base driver Bc.

The timing gate signal is a control signal that increases and reduces the pulse duration of the base currents Sa, Sb depending on the amplitude of the sloping energization signal. The transistors Tra through Trd are now caused to switch on and off, so that the inverter B produces a high-frequency alternating current. The high-frequency alternating current from the inverter B is converted by the welding transformer T and the rectifiers Da, Db into a direct current that is supplied to the workpiece W through the welding gun assembly D.

During this time, the workpiece W is gripped by the gun arms 4, 6 in an initial stage, and only the direct current depending on the sloping energization signal flows through the workpiece W for the preset time period tb in the preliminary energization control process. Upon elapse of the preset time period $t_b$, the timer 38 sends a monitoring end signal (not shown) to the CPU 22. At a time $t_a$, the CPU 22 reads a next clock pulse Pb of the energization initializing signal from the RAM 26. The count of the counter 36 is set to "2", and the timer 38 starts monitoring the time period from a leading edge of the clock pulse Pb. The current controller 40 is supplied again with a sloping energization signal having an initial value Va, enabling the base driver Bc to supply the base currents Sa, Sb to the inverter B. The welding gun assembly D now supplies again a direct current to the workpiece W for a preset time period tb in the preliminary energization control process.

In the preliminary energization control process, the workpiece W is supplied with direct currents a total of six times from the time $t_{az}$ to a time $t_{ab}$. During the six successive time periods tb, the current detector 12 detects the direct currents supplied to the welding gun assembly D. If the detected current is higher than a predetermined level, then the pressure under which the workpiece W is pressed or gripped by the gun arms 4, 6 in the initial stage is determined as being normal, and the main energization delay control process is thereafter carried out. If the detected current is lower than the predetermined level, then the CPU 22 reads a welding command signal again and starts the above sequence again.

The main energization delay control process delays the ramp energization control process and the main energization control process until the workpiece W is gripped under proper pressure. The RAM 26 stores a time period $t_{ab}-t_{ac}$ for which the main energization delay control process is to continue, the time period being determined depending on the thickness, the material, and other qualities of the workpiece W. The time period $t_{ab}-t_{ac}$ is read from the RAM 26 and supplied through the I/O interface 52 to the latch 58 where it is latched. Clock pulses from the CPU 22 are supplied through the I/O interface 56 to the counter 54 which counts the supplied clock pulses. The output signals from the latch 58 and the counter 54 are compared with each other by the comparator 60, and if the compared output signals agree with each other, the comparator 60 applies a signal through the I/O interface 62 to the CPU 22. Now, the CPU 22 starts the ramp energization control process at a time $t_{ac}$ and then the main energization control process at a time $t_{ad}$.

The ramp energization control process is effected during a time period $t_s$ from the time $t_{ac}$ to the time $t_{ad}$.

In the time period $t_s$, a ramp signal (see FIG. 2 at (d)) is supplied from the current controller 40 to the base driver Bc based on data read from the RAM 26. When the current detected by the current detector 12 reaches a predetermined current Ia (see FIG. 2 at (e)), the ramp energization control process is over and the main energization control process (feedback control process) is started. In the main energization control process, the predetermined current Ia is supplied to the workpiece W from the time $t_{ad}$ to at time $t_{ae}$.

After the main energization control process, the workpiece W remains gripped by the welding gun assembly D for a time period from the time $t_{ae}$ to a time $t_{af}$. At the time $t_{af}$, a welding end signal (see FIG. 2(f)) is sent from the timer 38 to the robot controller Cc, after which the welding control signal from the robot controller Cc is stopped at a time $t_{ag}$. At this time, one welding cycle is finished.

Figure 3:
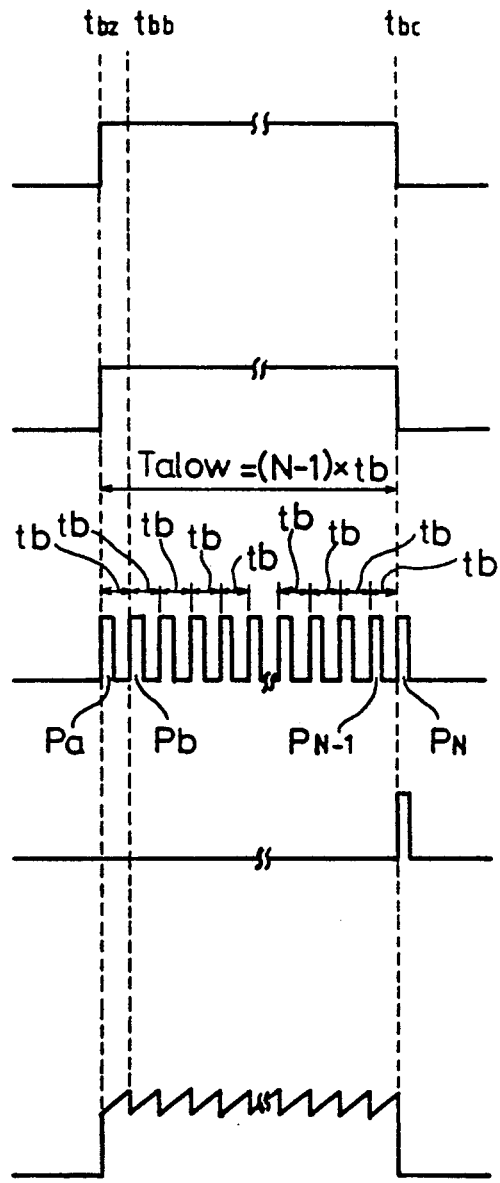
FIGS. 3(a)-3(e) are timing charts of signal waveforms on a time base in the operation of the direct-current resistance welding apparatus shown in FIG. 1.

The quasi-welding-interrupt control process will be described below with reference to FIG. 3.

If the pneumatic pressure from the pneumatic pressure source Ar is greatly reduced, failing to actuate the movable gun arms 4, 6, or if insulative dust deposits are present between the welding electrodes 8, 10 and the workpiece W, then no current is supplied to the workpiece W, and the welding operation is interrupted while the workpiece W is being gripped between the movable gun arms 4, 6.

The interruption of the welding operation is carried out according to the quasi-welding-interrupt control process. More specifically, in response to a leading edge of a welding command signal from the robot controller Cc (see FIG. 3 at (a)), the CPU 22 supplies a pressurization signal (see FIG. 3 at (b)) through the I/O interface 28 to the solenoid-operated on/off valve Dm. Then, the CPU 22 reads a clock pulse Pa of the energization initializing signal (see FIG. 3 at (c)) from the RAM 26, and supplies a sloping energization signal (see FIG. 3 at (e)) to the current controller 40 at a time $t_{bz}$. Now, the ramp energization control process is initiated.

After elapse of a time period $t_b$, the CPU 22 determines whether a current is supplied to the workpiece W based on the signal from the current detector 12. If no current is supplied to the workpiece W, then the CPU 22 supplies a sloping energization signal again to the current controller 40 at a time $t_{bb}$. The CPU 22 effects such a current check N times (N−1 times on an initial setting). When an allowable time period Talow corresponding to $(N-1) \times t_b$ has elapsed, the CPU 22 applies a quasi-welding-interrupt signal (see FIG. 3(d)) through the I/O interface 28 to the robot controller Cc, de-energizing associated devices (not shown). At the same time, the CPU 22 stops applying the energization signal at a time $t_{bc}$ (see FIG. 3 at (e)). Now, the welding operation is interrupted.

Figure 4:
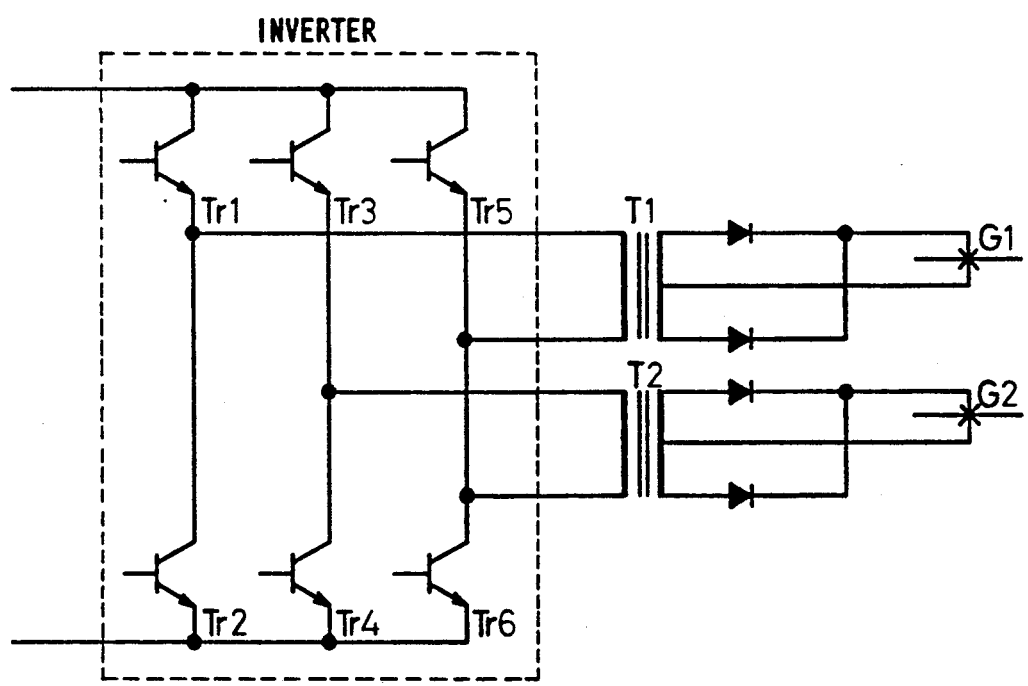
FIG. 4 is a circuit diagram of an inverter, a welding transformer/rectifier assembly, and welding guns of a direct-current resistance welding apparatus according to a second embodiment of the present invention.

FIG. 4 shows a direct-current resistance welding apparatus according to a second embodiment of the present invention. The direct-current resistance welding apparatus has an inverter comprising six transistors Tr1 through Tr6 for energizing welding transformers T1, T2 to enable two welding guns G1, G2 to weld workpieces. The direct-current resistance welding apparatus shown in FIG. 4 includes a welding timer circuit identical to that shown in FIG. 1.

In FIG. 4, the transistors Tr1 through Tr6 are switchingly driven by the base driver Bc in the welding timer circuit E to energize the transformers T1, T2 that are connected to the output terminals of the inverter. To energize the welding transformer T1, for example, the transistors Tr1, Tr6 are first rendered conductive and then the transistors T5, T2 are rendered conductive in response to a control signal that is supplied from the timer 38 to the base driver Bc through the current controller 40.

The transistors Tr1, Tr6 and Tr5, Tr2 are alternatively energized to enable the welding gun G1 to weld the corresponding workpiece. Then, the transistors Tr3, Tr6 and Tr5, Tr4 are alternatively energized to enable the welding gun G2 to weld the corresponding workpiece.

Figure 5:
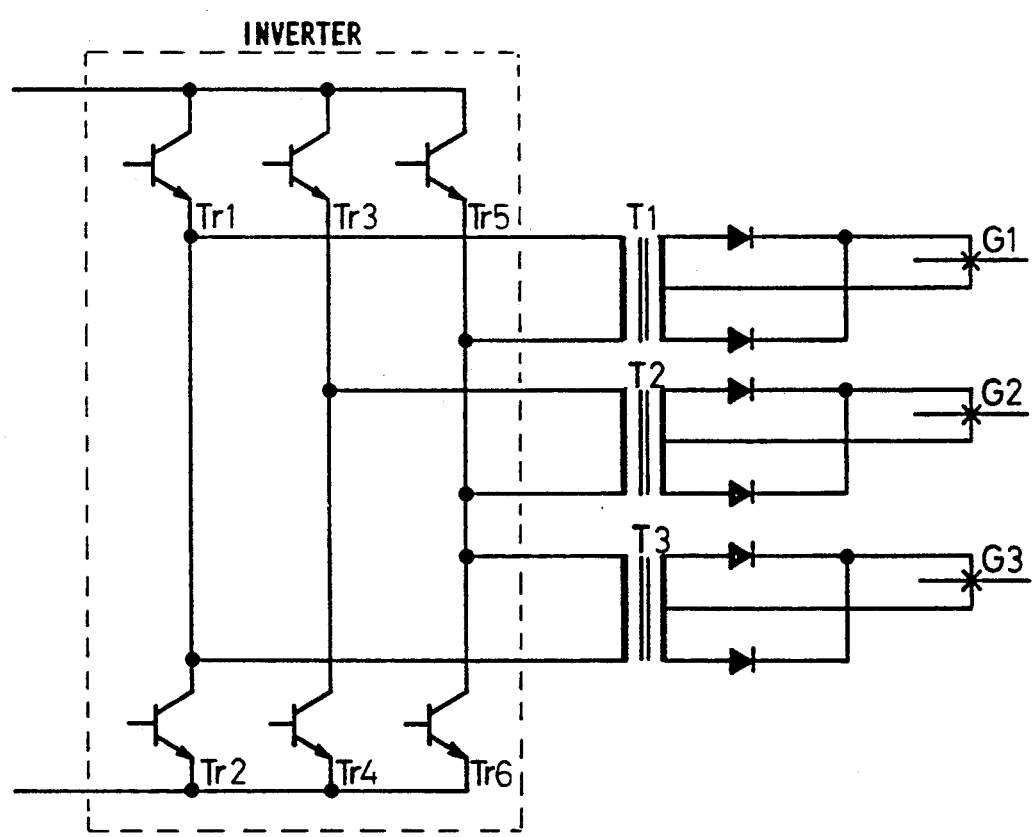
FIG. 5 is a circuit diagram of an inverter, a welding transformer rectifier assembly, and welding guns of a direct-current resistance welding apparatus according to a third embodiment of the present invention.

FIG. 5 shows a direct-current resistance welding apparatus according to a third embodiment of the present invention. The direct-current resistance welding apparatus shown in FIG. 5 includes a welding timer circuit identical to that shown in FIG. 1. In the third embodiment, the direct-current resistance welding apparatus includes a converter (not shown) having a current capacity large enough to energize two welding guns at the same time. The direct-current resistance welding apparatus includes three welding transformers T1, T2, T3. When the welding transformer T1 is energized by the transistors Tr1, Tr6, the welding transformer T3, for example, is also energized by the transistors Tr5, Tr2. Since the two transformers are energized simultaneously, the current capacity of the converter must be large enough to supply a current to two welding guns at the same time.

Figure 6:
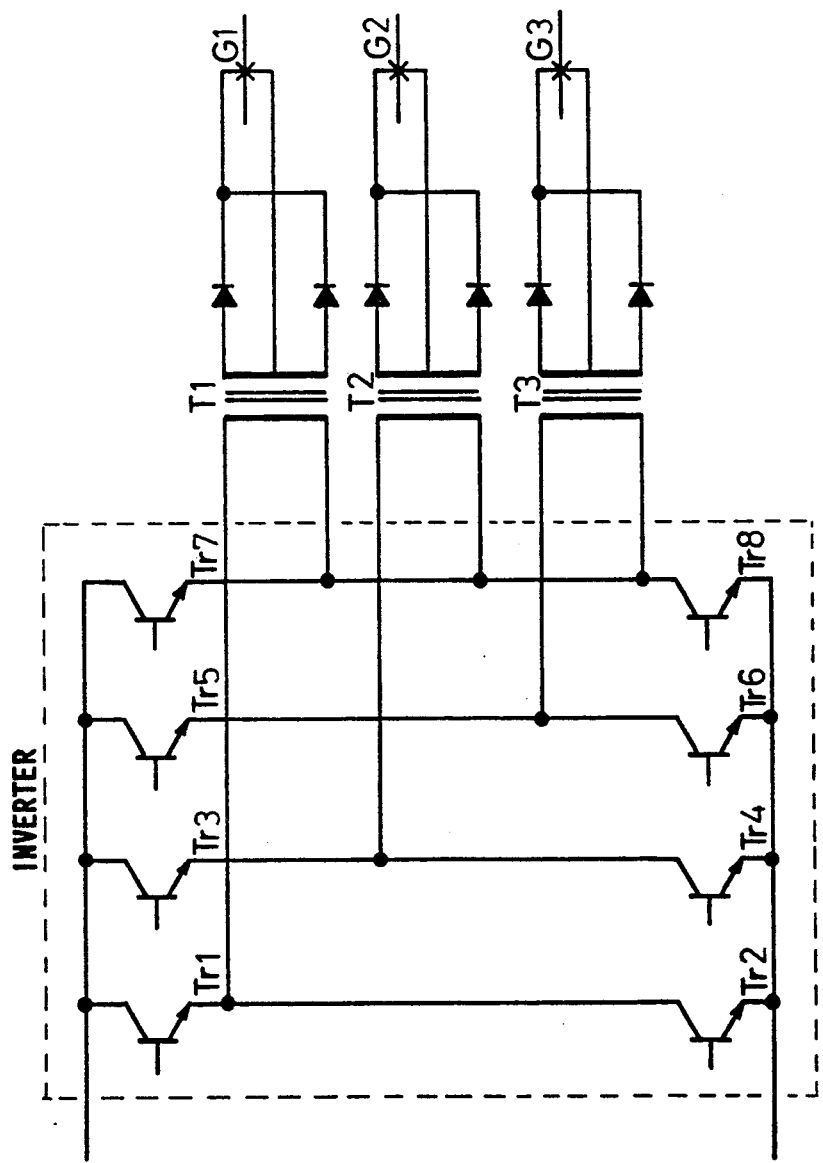
FIG. 6 is a circuit diagram of an inverter, a welding transformer rectifier assembly, and welding guns of a direct-current resistance welding apparatus according to a fourth embodiment of the present invention.

FIG. 6 shows a direct-current resistance welding apparatus according to the a fourth embodiment of the present invention. The direct-current resistance welding apparatus shown in FIG. 6 includes a welding timer circuit identical to that shown in FIG. 1. The direct-current resistance welding apparatus shown in FIG. 6 includes an inverter comprising transistors Tr1 through Tr8, and welding transformers T1, T2, T3. The welding transformer T3 can be energized when the transistors Tr5, Tr8 and Tr7, Tr8 are alternatively energized. As shown in FIG. 6, two additional transistors allow an additional welding transformer to be connected.

In the second through fourth embodiments, it is possible to weld the workpieces while all the welding guns are pressurized to grip the workpieces.

Figure 7:
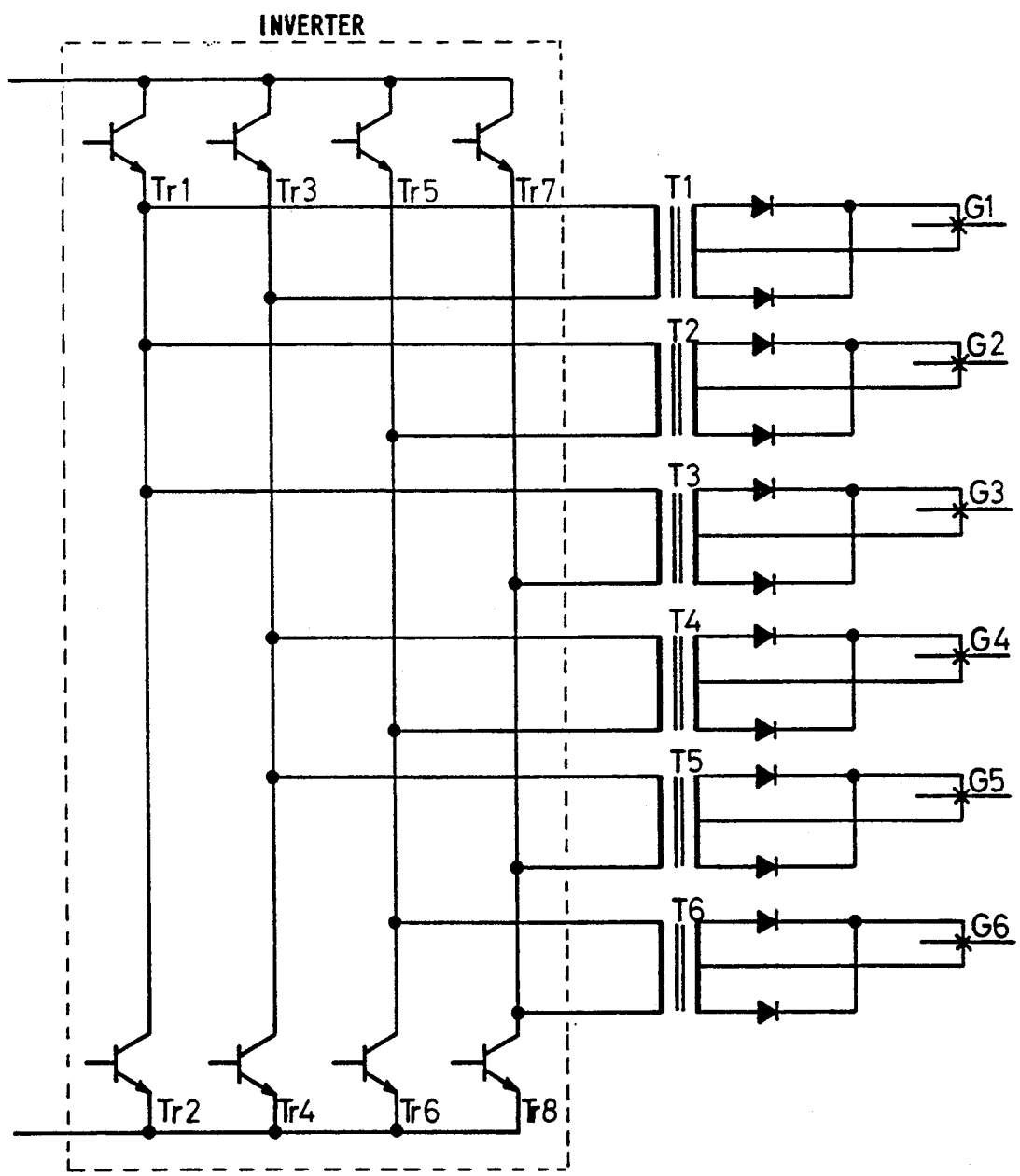
FIG. 7 is a circuit diagram of an inverter, a welding transformer/rectifier assembly, and welding guns of a direct-current resistance welding apparatus according to a fifth embodiment of the present invention.

FIG. 7 shows a direct-current resistance welding apparatus according to the a fifth embodiment of the present invention. The direct-current resistance welding apparatus shown in FIG. 4 includes a welding timer circuit identical to that shown in FIG. 7. The direct-current resistance welding apparatus shown in FIG. 7 includes six welding transformers T1 through T6 which are selectively energized when welding guns are pressurized in a desired combination to grip corresponding workpieces. The welding current is prevented from flowing into a plurality of welding transformers at the same time. For example, if all the welding guns were pressurized when the transistors Tr1, Tr4 are energized, a current path would be created to allow a current to flow through the welding transformers T2, T4, and also a current path would be created to allow a current to flow through the welding transformers T3, T5. However, if the welding guns G2, G3, G4, G5 or the welding guns G2, G4, or G2, G5, or G3, G4, or G3, G5 are not pressurized, then no current flows through the secondary windings of the welding transformers T2, T3, T4, T5. Thus, such selective pressurization of the welding guns permits more welding guns to be connected than possible if all the welding guns were simultaneously pressurized to grip the corresponding workpieces.

Figure 8:
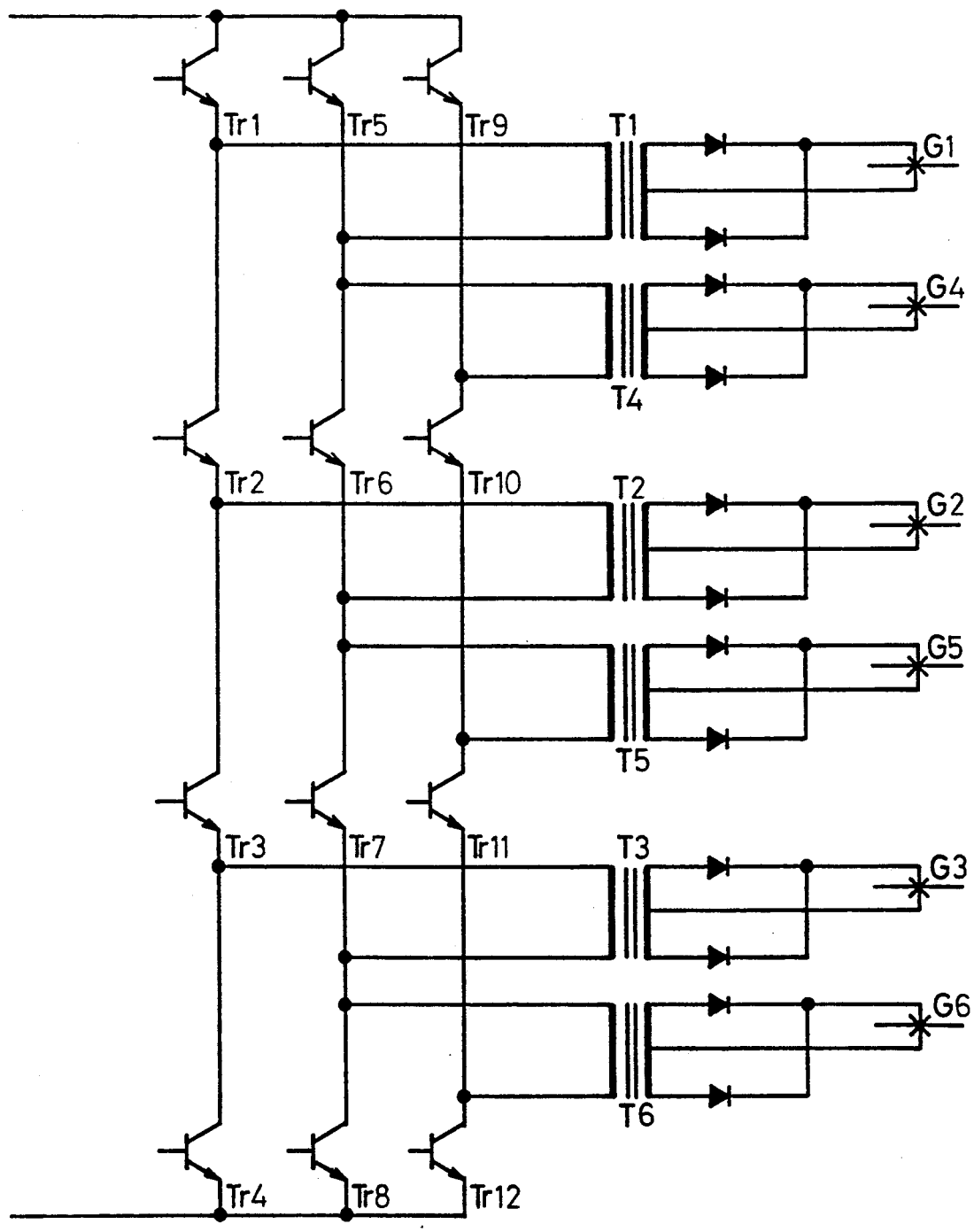
FIG. 8 is a circuit diagram of an inverter, a welding transformer/rectifier assembly, and welding guns of a direct-current resistance welding apparatus according to a sixth embodiment of the present invention.

FIG. 8 shows a direct-current resistance welding apparatus according to the a sixth embodiment of the present invention. The direct-current resistance welding apparatus shown in FIG. 4 includes a welding timer circuit identical to that shown in FIG. 8. In FIG. 8, a plurality of welding guns G1 through G6 connected to respective welding transformers T1 through T6 are controlled by a single inverter composed of transistors Tr1 through Tr12 and a welding timer circuit. The welding guns G1 through G6 may be pressurized in any desired combination under the control of the CPU 22 of the welding timer circuit E.

The transistors Tr1 through Tr12 are energized by the base driver Bc of the welding timer circuit E. To energize the welding transformer T1, the transistors Tr1, Tr6, Tr7, Tr8 are rendered conductive by a signal from the base driver Bc, and then the transistors Tr5, Tr2, Tr3, Tr4 are rendered conductive by a signal from the base driver Bc. The welding gun G1 now welds the workpiece gripped thereby.

Then, the base driver Bc alternatively energizes the transistors Tr1, Tr2, Tr7, Tr8 and the transistors Tr5, Tr6, Tr3, Tr4, enabling the welding gun G2 to weld the gripped workpiece.

To energize the welding gun G3, the base driver Bc alternatively energizes the transistors Tr1, Tr2, Tr3, Tr8 and the transistors Tr5, Tr6, Tr7, Tr4.

To energize the welding gun G4, the base driver Bc alternatively energizes the transistors Tr5, Tr10, Tr11, Tr12 and the transistors Tr9, Tr6, Tr7, Tr8. To energize the welding gun G5, the base driver Bc alternatively energizes the transistors Tr5, Tr6, Tr11, Tr12 and the transistors Tr9, Tr10, Tr7, Tr8. To energize the welding gun G6, the base driver Bc alternatively energizes the transistors Tr5, Tr6, Tr7, Tr12 and the transistors Tr9, Tr10, Tr11, Tr8.

In the above description, the welding guns G1 through G6 are successively energized for an easier understanding of the embodiment. Actually, the primary windings of the welding transformers are switched over in each cycle of switching operation of the inverter for apparent simultaneous energization of the welding guns.

Figure 9:
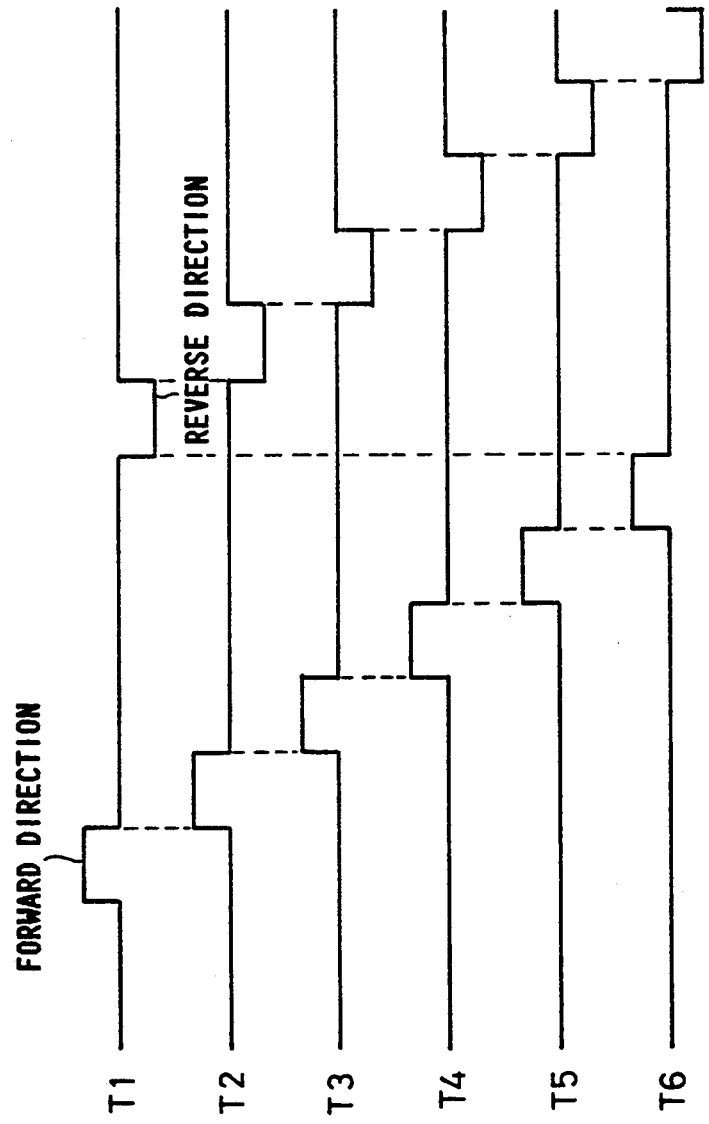
FIG. 9 is a timing chart showing a sequence of energization of the welding transformers of the welding transformer assembly shown in FIG. 8.

FIG. 9 shows a sequence of such successive energization of the welding transformers T1 through T6. The transistors Tr1, Tr6, Tr7, Tr8 are turned on to energize the welding transformer T1 in a forward direction in a first step. Then, the transistors Tr5, Tr6, Tr3, Tr4 are turned on to energize the welding transformer T2 in a forward direction a second step. Likewise, the welding transformers T3, T4, T5, T6 are successively energized in a forward direction. Thereafter, the transistors Tr5, Tr2, Tr3, Tr4 are turned on to energize the welding transformer T1 in a reverse direction. Likewise, the other transformers T2, T3, T4, T5, T6 are successively energized in a reverse direction.

After the welding current is stopped, the movable gun arms of the welding guns are moved away from each other, and the welding guns are moved to next welding positions. The welding guns are then pressurized to grip the workpieces, and the above successive switching process is carried out on the welding transformers.

In the sixth embodiment, the welding transformers T1 through T6 are connected between the transistors Tr1 through Tr12 that are connected in series-connected arms. The transistors Tr1 through Tr12 are energized in response to control signals from the timer 38 in the welding timer circuit E. With the welding guns G1 through G6 pressurized at the same time, the transistors Tr1 through Tr12 are energized by control signals that are produced by the timer 38 according to a predetermined sequence. In this manner, a welding current is prevented from flowing to other welding guns, e.g., the welding guns G2 through G6, than a desired welding gun, e.g., the welding gun G1. Since the switching operation is very fast, the welding guns G1 through G6 are apparently energized at the same time.

In FIG. 8, parallel transistors may be added to allow more welding guns to be connected.

The sequence of successive energization of the transistors Tr1 through Tr12 shown in FIG. 8 will be described below with reference to FIGS. 10 and 11.

Figure 10:
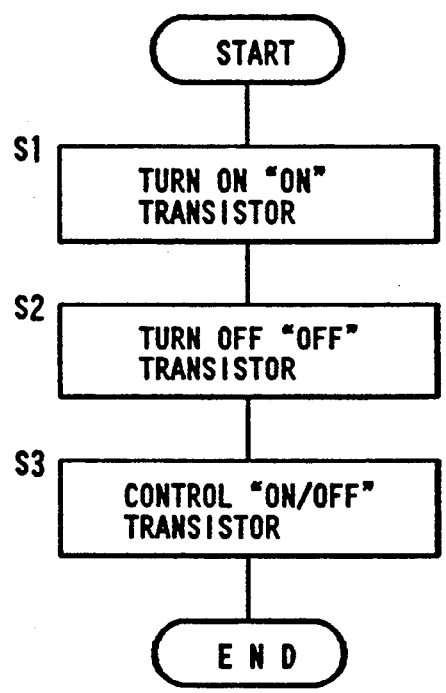
FIG. 10 a flowchart of a sequence of energization of the transistors of the inverter shown in FIG. 8.

The welding transformer T1, for example, is energized in the forward and reverse directions as follows:

As shown in FIG. 10, to energize the welding transformer T1 in the forward and reverse directions, the transistors Tr3, Tr4, Tr7, Tr8 are rendered conductive in a step S1, and the transistors Tr9, Tr10, Tr11, Tr12 are rendered nonconductive in a step S2. Then, the transistors Tr1, Tr2, Tr5, Tr6 that switch on and off according to the information relative to the energization in the forward and reverse directions are rendered conductive or nonconductive in a step S3.

FIG. 11 shows a control map showing how the transistors Tr1 through Tr12 are controlled to energize the welding transformers T1 through T6 by the inverter B.

As shown in FIG. 11, to energize the welding transformer T1 in the forward direction, the transistors Tr1, Tr6 are rendered conductive, and the transistors Tr5, Tr2 are rendered nonconductive. To energize the welding transformer T1 in the reverse direction, the transistors Tr5, Tr2 are rendered conductive, and the transistors Tr1, Tr6 are rendered nonconductive.

When the welding transformer T1 is energized in the forward direction, even with the transistors Tr3, Tr4 being rendered conductive, the current which energizes the welding transformer T1 in the forward direction flows through the transistors Tr1, Tr6, Tr7, Tr8.

This is because the resistances between the collectors and the emitters of the transistors Tr3, Tr4 as they are energized are apparently zero as compared with the resistances of the welding transformers T2, T3, allowing the energizing current to flow through the transistors Tr7, Tr8.

Likewise, when the welding transformer T1 is energized in the reverse direction, even with the transistors Tr7, Tr8 being rendered conductive, the current which energizes the welding transformer T1 in the reverse direction flows through the transistors Tr5, Tr2, Tr3, Tr4.

Therefore, when the welding transformer T1 is to be energized, the transistors Tr3, Tr4, Tr7, Tr8 are rendered conductive in advance. In this manner, the welding transformer T1 can be energized in the forward direction by rendering the transistors Tr1, Tr6, and the welding transformer T1 can be energized in the reverse direction by rendering the transistors Tr5, Tr2. Accordingly, the number of transistors that are rendered conductive at the same time may be ½ of that of transistors of conventional apparatus, making it possible to reduce radiation noise due to switching noise of the transistors.

Switching times of transistors have inherent errors. Since the transistors with such inherent switching time errors are caused to switch at the same time, the times in which they are rendered conductive in the forward and reverse directions suffer large errors. The errors of the conduction times tend to give rise to accumulate residual magnetism in the welding transformers, resulting in localized magnetization. According to the 6th embodiment, however, inasmuch as the number of transistors that are rendered conductive at the same time is reduced to half, the localized magnetization of the welding transistors due to switching time errors of the transistors can be reduced.

A direct-current resistance welding apparatus according to a seventh embodiment of the present invention will be described below with reference to FIGS. 12 through 17.

FIG. 12 shows in block form the direct-current resistance welding apparatus according to the seventh embodiment of the present invention, the direct-current resistance welding apparatus being generally designated by the reference numeral 2.

The direct-current resistance welding apparatus 2 generally comprises a converter A connected to a three-phase alternating-current power supply, for converting an alternating current into a direct current, an inverter B connected to the converter A, a current detector 69 connected between the converter B and the inverter A, for detecting a current flowing to the inverter A, a plurality of welding transformer/rectifier assemblies Cl through Cn for rectifying high-frequency alternating currents from the inverter B, a plurality of welding guns D1 through Dn connected to the welding transformer/rectifier assemblies Cl through Cn, a welding control circuit 70, a switching circuit 72 connected to the inverter B and the welding control circuit 70, and a switching control circuit 74 connected to the welding control circuit 70, the switching circuit 72, and the welding transformer/rectifier assemblies Cl through Cn, and a robot controller Cc connected to the switching control circuit 74.

Figure 13:
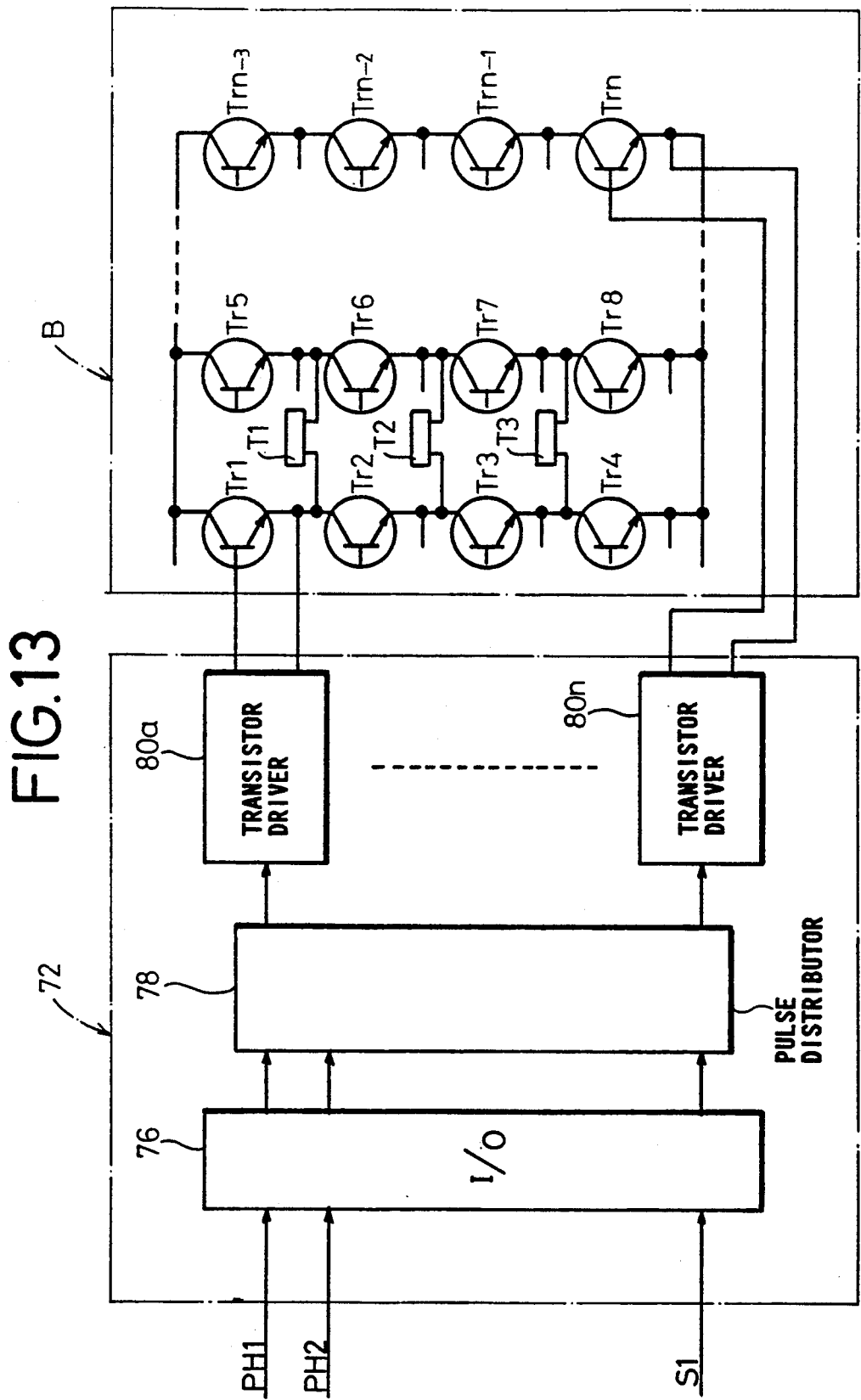
FIG. 13 is a block diagram of a switching circuit and an inverter of the direct-current resistance welding apparatus shown in FIG. 12.

FIG. 13 shows in detail the inverter B and the switching circuit 72.

The inverter B comprises transistors Tr1 through Trn as switching devices, the transistors Tr1 through Trn having terminals connected to the welding transformer/rectifier assemblies Cl through Cn. The switching circuit 72 comprises an I/O interface 76, a pulse distributor 78, and a plurality of transistor drivers 80a through 80n.

Switching pulses PH1, PH2 that are supplied in each phase from the welding control circuit 70, and a transistor switching signal S1 that is supplied from the switching control circuit 74 are transmitted through the I/O interface 76 to the pulse distributor 78. In response to the switching pulses PH1, PH2 and the transistor switching signal S1, the pulse distributor 78 energizes the transistor drivers 80a through 80n for the respective transistors Tr1 through Trn.

Figure 14:
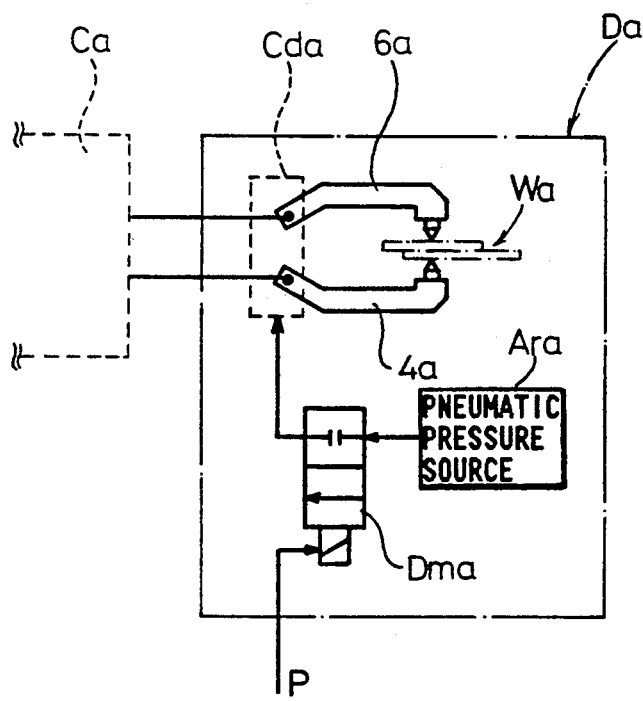
FIG. 14 is a block diagram of a welding gun of the direct-current resistance welding apparatus shown in FIG. 12.

FIG. 14 shows a welding gun Da in detail. Other welding guns Db through Dn are identical to the welding gun Da, and will not be described below. The welding guns Da through Dn correspond to the welding guns D1 through Dn shown in FIG. 12.

The welding gun Da comprises a pair of movable gun arms 4a, 6a, a pneumatic cylinder Cda for moving the gun arms 4a, 6a toward and away from each other, a pneumatic pressure source Ara for actuating the pneumatic cylinder Cda, and a solenoid-operated on/off valve Dma for selectively supplying the pneumatic pressure from the pneumatic pressure source Ara to the pneumatic cylinder Cda in response to a signal P from the switching control circuit 74.

Figure 15:
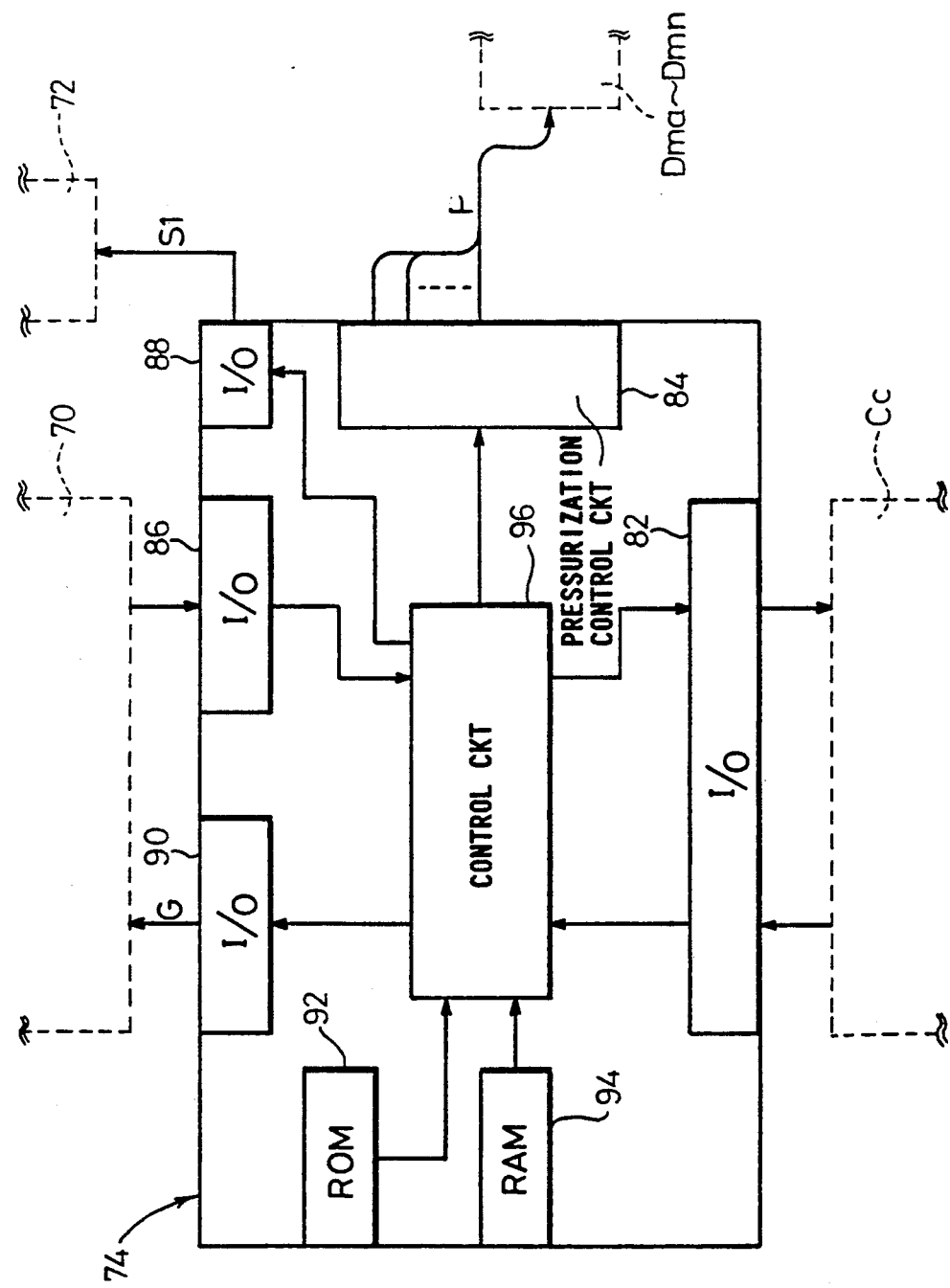
FIG. 15 is a block diagram of a switching control circuit of the direct-current resistance welding apparatus shown in FIG. 12.

FIG. 15 shows in block form the switching control circuit 74.

The switching control circuit 74 comprises an I/O interface 82 for transmitting signals to and receiving signals from the robot controller Cc, a pressurization control circuit 84 for outputting the signal P to control the solenoid-operated on/off valves Dma through Dmn, an I/O interface 86 for receiving signals from the welding control circuit 70, an I/O interface 88 for transmitting the switching signal S1 to the switching circuit 72, an I/O interface 90 for supplying an energization signal G to the welding control circuit 70, a ROM 92 which stores programs for controlling the welding guns D1 through Dn, a RAM 94 for temporarily storing control information and other data, and a control circuit 94 connected to the I/O interfaces 82, 86, 88, 90, the pressurization circuit 84, the ROM 92, and the RAM 94.

Operation of the direct-current resistance welding apparatus 2 for energizing the welding guns D1 through Dn will be described below with reference to FIGS. 12 through 17.

The robot controller Cc stores, as learned data, a welding program containing information indicative of the welding guns D1 through Dn and welding conditions such as a pressurization time, an energization time, a holding time, and an end delay. The robot controller Cc supplies a signal, based on the welding program, through the I/O interface 82 to the control circuit 96.

If the control circuit 96 is supplied with a welding program signal indicative of the welding gun Da which has welding conditions as shown in FIG. 16, then the control circuit 96 applies a signal P through the pressurization control circuit 84 to the solenoid-operated on/off valve Dma for enabling the movable gun arms 4a, 6a to grip a workpiece Wa (see FIG. 14). The solenoid-operated on/off valve Dma is actuated to apply the pneumatic pressure from the pneumatic pressure source Ara to the pneumatic cylinder Cda. The pneumatic cylinder Cda is actuated to cause the movable gun arms 4a, 6a to grip the workpiece Wa under pressure. After the workpiece Wa has been gripped under pressure during an initial pressurization time period t1 (see FIG. 16 at (a)), the control circuit 96 confirms an energization ending signal supplied from the welding control circuit 70 through the I/O interface 86, and then outputs an energization signal G to the welding control circuit 70 through the I/O interface 86. The control circuit 96 also outputs a switching signal A1 through the I/O interface 88 to the I/O interface 76 of the switching circuit 76. In response to the energization signal G, the welding control circuit 70 generates switching pulses PH1, PH2 for an energization time period t2 (see FIG. 16 at (a)), and applies the switching pulses PH1, PH2 to the I/O interface 76 of the switching circuit 72. The pulse distributor 78, which has been supplied with the switching signal S1 and the switching pulses PH1, PH2 through the I/O interface 76, energizes the transistor drivers 80a through 80n to turn on the transistors Tr1 through Trn of the inverter B. More specifically, the transistors Tr1, Tr6, Tr7, Tr8 are energized with the switching pulse PH1 (see FIG. 17 at (a), and the transistors Tr5, Tr2, Tr3, Tr4 are energized with the switching pulse PH2 (see FIG. 17 at (b)). The primary winding of the welding transformer is now supplied with pulses as shown in FIG. 17 at (c), and the rectifier circuit connected to the secondary winding of the welding transformer supplies a direct current (see FIG. 17 at (d)) between the movable gun arms 4a, 6a of the welding gun Da for the time period t2. When the time period t2 is over, the workpiece Wa is held by the movable gun arms 4a, 6a for a holding time period t3 (see FIG. 16 at (a)), and then an end delay time t4 (see FIG. 16 at (a)) is allowed to elapse which is required for the movable gun arms 4a, 6a to move away from each other. Upon elapse of the end delay time t4, one welding cycle is finished. When the time period t2 is over, the welding control circuit 70 applies an energizing ending signal through the I/O interface 86 to the control circuit 96. When the end delay time t4 is over, the control circuit 96 transmits a signal indicative of the completion of one welding cycle to the robot controller Cc through the I/O interface 82.

If the robot controller Cc applies welding program signals indicative of the welding guns Db, Dc, and Dn to the switching control circuit 74 while the above welding cycle is being effected, then the control circuit 96 controls the pressurization circuit 84 to start pressurize the welding guns Db, Dc, Dn, and stores initial pressurization time periods ①, ②, ③ (see FIG. 16 at (b), (c), (d)) in the RAM 94. When the control circuit 96 is supplied with a signal indicating the completion of the energization time period for the welding gun Da from the welding control circuit 70, the control circuit 96 supplies the welding control circuit 70 with an energization signal G to energize the welding gun for which the initial energization period has been completed earlier than the other welding guns, e.g., the welding gun Dc (see FIG. 16 at (c)), and also applies a switching signal S1 to the switching circuit 72. The switching circuit 72 now switchingly energizes the transistors Tr1 through Trn of the inverter B to energize the welding gun Dc.

Likewise, when a signal indicative of the completion of the energization time period is subsequently supplied to the switching control circuit 74 from the welding control circuit 70, one of the welding guns Db, Dn for which the initial energization period has been completed earlier is energized by an energization signal G and a switching signal A1 from the switching control circuit 74.

The current detector 69 detects the current flowing from the converter A to the inverter B. When the detected current is of a value representing a malfunction, the welding control circuit 70 applies a malfunction signal to the switching control circuit 74. In response to the malfunction signal, the switching control circuit 74 sends a failure signal to the robot controller Cc, and also stops the transmission of the energization signal G and the switching signal S1 to de-energize the welding guns Da through Dn immediately.

In the above embodiment, the switching control circuit 74 allows the welding guns Da through Dn to be pressurized and energized independently when the switching control circuit 74 is supplied with welding program signals to actuate the welding guns Da through Dn from the robot controller Cc. Since the switching control circuit 74 can energize the welding guns Da through Dn successively in the order in which their initial pressurization time periods are over, the inverter B operates continuously without an undesired resting period. Therefore, the availability of the inverter B and hence the overall direct-current resistance welding apparatus is increased.

The direct-current resistance welding apparatus according to the present invention has an increased number of pairs of transistors in the inverter, and the control circuit switches the transistor pairs and pressurizes the welding guns in a desired combination. Workpieces can thus be welded at multiple points with the single inverter. The direct-current resistance welding apparatus with the single inserter may be reduced in size, and can weld workpieces in a shortened period of time.

The number of transistors in the inverter is increased, and the control circuit is capable of switching the transistors in each cycle of the switching period of the inverter. With such an arrangement, the welding guns may be pressurized in any desired combination, and workpiece can be welded at multiple points with the single inverter. The direct-current resistance welding apparatus with the single inserter may be reduced in size, and can weld workpieces in a shortened period of time. In addition, the number of welding guns used may easily be increased or reduced.

Inasmuch as the number of transistors to be controlled for energizing the welding transformers may be reduced, it is possible to reduce radiation noise generated upon switching of the transistors. The difference between the periods of time for energization in the forward and reverse directions may be reduced to reduce any residual magnetism accumulated in the welding transformers. Accordingly, the welding transformers are prevented from localized magnetization.

The switching control circuit of the direct-current resistance welding apparatus is capable of effecting pressurizing and energizing steps independently of each other. The switching control circuit stores the order of the welding guns with respect to the completion of the initial pressurization time period. When the switching control circuit is supplied with an energization ending signal from the welding control circuit, the switching control circuit energizes the welding guns in the order in which they are readied for energization. The resting time in which the inverter is not in operation can thus be shortened, and the inverter can efficiently be put to use.

Although certain preferred embodiments of the present invention have been shown and described in detail, it should be understood that various changes and modifications may be made therein without departing from the scope of the appended claims.

What is claimed is:

1. A direct-current resistance welding apparatus comprising:
   a direct-current source,
   a plurality of welding guns,
   welding transformers connected to respective ones of said welding guns via rectifiers and pressurizing means for pressurizing respective ones of said welding guns, said apparatus further comprising:
   an inverter for supplying an alternating current to at least one of said welding transformers in succession, comprising:
   at least three rows of switching elements, said rows being connected in parallel across a positive bus and a negative bus of the direct-current source, each of said rows including two switching elements connected in series to form a middle junction, each of said welding transformers being directly connected across a pair of said middle junctions; and
   a timer circuit for instructing said inverter to supply the alternating current to said one of said welding transformers in accordance with a given operating sequence, by selecting two rows across which said one of said welding transformers is connected and making a pair of switching elements ON and another pair of switching elements OFF alternately, one of said pair of switching elements being on the positive bus side of said middle junctions in one of said selected rows and the other on the negative bus side in the other row, and one of said another pair of switching elements being on the negative bus side of said middle junctions in one of said selected rows and the other on the positive bus side in the other row.

2. A direct-current resistance welding apparatus according to claim 1, wherein said timer circuit further instructs said pressurizing means to pressurize said welding guns in accordance with said operating sequence.

3. A direct-current resistance welding apparatus comprising:
   a direct-current source,
   a plurality of welding guns,
   welding transformers connected to respective ones of said welding guns via rectifiers and pressurizing means for pressurizing respective said welding guns, said apparatus further comprising:
   an inverter for supplying an alternating current to at least one of said welding transformers in succession, comprising:
      at least two rows of switching elements, said rows being connected in parallel across a positive bus and a negative bus of the direct-current source, each of said rows including at least three switching elements connected in series to form intermediate junctions, each of said welding transformers being directly connected across a pair of said intermediate junctions at the same level counted from one end of each row; and
      a timer circuit for instructing said inverter to supply the alternating current to said one of said welding transformers in accordance with a given operating sequence by selecting two rows across which said one of welding transformers is connected and making a set of switching elements ON and another set of switching elements OFF alternately, m of said set of switching elements being on the positive bus side of said intermediate junctions in one of the selected rows and n of said another set of switching elements being on the negative bus side in one of the selected rows and m on the positive bus side in the other row, where the sum of m and n being equal to the number of the switching elements included in a row.

4. A direct-current resistance welding apparatus according to claim 3 wherein said timer circuit further instructs said pressurizing means to pressurize said welding guns in accordance with said operating sequence.

5. A direct-current resistance welding apparatus according to claim 3, wherein said timer circuit selects two rows of switching elements across which said one of welding transformers is connected, and makes a pair of switching elements On and another pair of switching elements OFF alternately, one of said pair of switching elements being on the positive bus side adjacent to said intermediate junctions across which said one of welding transformers is connected in one of the selected rows and the other on the negative bus side adjacent to said intermediate junctions in the other row, and one of said another pair of switching elements being on the negative bus side adjacent to said intermediate junctions across which said one of welding transformers is connected in one of the selected rows and the other on the positive bus side adjacent to said intermediate junctions in the other row, while other switching elements included in said selected rows other than said pairs of switching elements made ON and OFF alternately being held ON for a time period for which said one of welding transformers being energized, and switching elements in the not-selected rows being held OFF.

6. A method of direct-current resistance welding using the resistance welding apparatus set forth in any of claim 1 through 5, comprising steps of:
   closing one of pressurizing means to have a welding gun grip a workpiece in it;
   applying an initial voltage from an inverter to the welding gun gripping the workpiece for a predetermined time period while measuring an initial current developed by said initial voltage;
   judging from the measured initial current whether or not the workpiece is gripped by the welding gun firmly enough to allow flowing of a rated welding current;
   repeating at a predetermined interval of time the steps of applying initial voltage and judging by a predetermined number of times in the case where the judgment being negative;
   increasing a welding current at a predetermined increasing rate to the rated welding current in the case where the judgment is positive, after delaying start of application of the welding circuit for a predetermined time period from the closing of the pressurizing means, and holding the rated current for a predetermined time; and
   releasing the workpiece by opening the welding gun, after maintaining pressurizing further for a predetermined time after the holding time of the rated welding current has been attained, or immediately releasing the workpiece after the negative judgment is determined when the repeating number of times in the step of repeating has expired.

* * * * *